(No Model.)
D. W. NORRIS.
MACHINE FOR FORMING GLASS JARS, BOTTLES, &c.
No. 314,975. Patented Mar. 31, 1885.
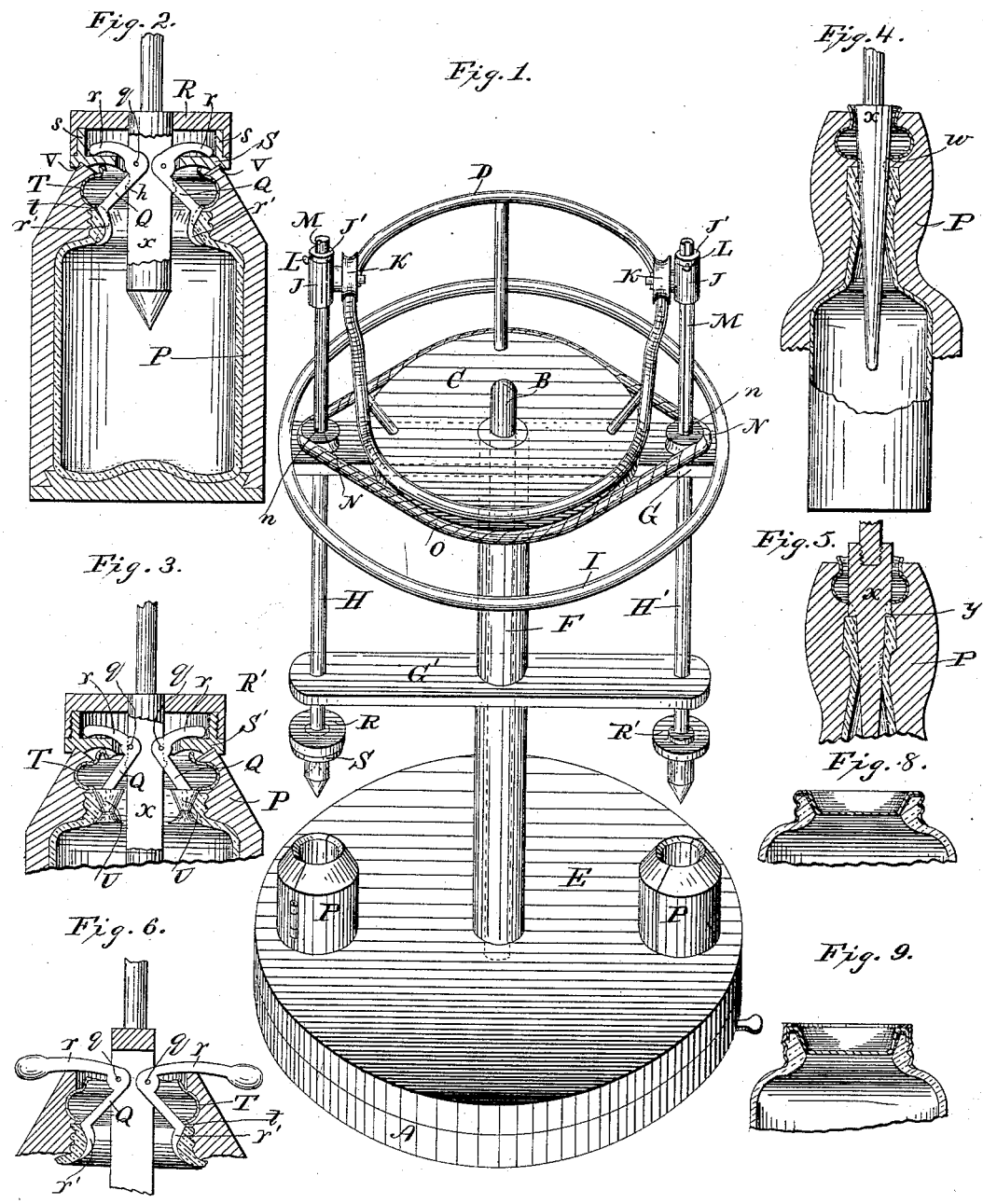
WITNESSES
Chas. R. Burr
A. J. Stuart
INVENTOR
Daniel W. Norris
by Church & Church
his Attorneys.

UNITED STATES PATENT OFFICE.

DANIEL W. NORRIS, OF ELGIN, ILLINOIS.

MACHINE FOR FORMING GLASS JARS, BOTTLES, &c.

SPECIFICATION forming part of Letters Patent No. 314,975, dated March 31, 1885.

Application filed July 25, 1884. (No model.)

*To all whom it may concern:*

Be it known that I, DANIEL W. NORRIS, of Elgin, in the county of Kane and State of Illinois, have invented certain new and useful Improvements in Machines for Forming Glass Jars, Bottles, &c.; and I do hereby declare the following to be a full, clear, and exact description of the same, reference being had to the accompanying drawings, forming a part of this specification, and to the figures and letters of reference marked thereon.

In the manufacture of glass jars, bottles, &c., by the ordinary process the melted glass is first gathered upon the blowing-tube, then partially blown, "marvered," &c., and finally placed in the mold and blown to cause it to fill and conform to the internal surface of the mold, which gives shape to the exterior of the jar, bottle, or other article being formed therein, and the blowing-tube is removed by breaking off the glass at the mouth of the mold. After this the vessels are usually removed from the mold and finished, either by grinding off the uneven broken top surface of the mouths or necks after they have been annealed, in which case the thickness and inner surface of the mouths or necks, and usually their tops, are irregular, or by reheating the mouths or necks and finishing them with the finishing-tool, in which case the lengths of necks or mouths are irregular. These irregularities are very objectionable, the former particularly when the vessel is to be closed by the use of a cork or other device fitted within the mouth or neck, and the latter when the vessel is to be closed by the use of a flanged or other cap screwed or otherwise fitted and secured over the mouth or neck, and both when it is desired to close the vessel by the use of a device which shall be fitted within and also over the top and outside of the mouth or neck. Seeing these defects I have set to work to so improve the machinery in use as to render possible the production of a succession of jars, bottles, &c., of unvarying proportions by one set of instrumentalities attended with the expenditure of less time, labor, and loss from breakage than heretofore.

I will first describe my invention at length, and will then point out its particular features of novelty in the claims at the end of this specification.

Referring to the accompanying drawings, Figure 1 is a perspective view of a machine constructed in accordance with my invention. Fig. 2 is a sectional view of the mold and the rotating mouth or neck former. Figs. 3, 4, 5, and 6 are similar views of modifications of the mouth or neck former. Fig. 7 is a sectional view of the locking device; and Figs. 8 and 9 are sectional views of glass vessels formed in accordance with my invention and having sheet-metal tops applied to them.

Similar letters of reference in the several figures indicate like parts.

The letter A represents the base of the machine; B, a vertical shaft connected rigidly to said base, and C a circular peripherally-grooved plate or disk rigidly attached to the upper end of said shaft and supporting the cam D, as shown.

A horizontal platform or disk, E, having a vertical hollow sleeve, F, is mounted upon the base A, and the vertical shaft B of the latter forms an axis for said platform and sleeve to rotate upon.

Secured rigidly to the sleeve F are two cross-bars, G G', lying in the same vertical plane, both of which are perforated for the passage of spindles H H', one of said bars having attached to it a hand-rim, I, by which to revolve said cross-bars and their connections.

Each of the spindles H H' is provided at its upper end with a sleeve, J, which carries upon a lateral arm or stud formed upon it a grooved friction-wheel, K, that rides upon the cam D.

A collar, J', is secured on each of the spindles above the sleeve J by means of a set-screw, L.

Each of the spindles is further provided with a pulley, N, which has a feather, *n*, that enters the longitudinal groove M, and causes both spindle and pulley to turn together, at the same time permitting the free longitudinal adjustment of the spindle without disturbing the pulley.

A band or cord, O, passes around the periphery of the disk C in the groove thereof, and also around the pulleys N, from which it results that when the frame carrying the spindles is rotated by means of the hand-rim I, or otherwise, an independent revolving motion will be given each of said spindles, while at the same time the spindles will be respectively elevated or depressed, according as their respective guide-wheels are at a higher or lower portion of the cam D.

Upon the lower ends of the spindles are attached the devices which co-operate with the molds to properly form the mouths or necks of the jars, bottles, &c., in the molds.

A clear understanding of the construction and operation of these devices will be obtained from an inspection of Figs. 2 and 3, taken in connection with the following description.

The lower end of each of the spindles is somewhat enlarged, or, preferably, provided with a detachable plunger, x, and to facilitate the introduction of this plunger into the mold it is preferably tapered or pointed, as shown. To this plunger, and within a slot in the same, are hung upon pivots q q two forming and cutting-off levers, Q, as shown in Fig. 2. These levers are of the general shape of a bell-crank, one arm, r, being preferably curved, and the other arm, r', formed at its extremity to correspond to the ultimate shape desired to be given to the inner surface of the finished part of the jar, bottle, or other article in the mold.

A collar, R, having a depending flange is attached to the plunger above the pivoted levers Q Q, and a loose collar, S, having a vertical flange, s, which laps the flange of the collar R, is arranged upon the plunger between the arms r and r' of the levers Q Q, as shown in Fig. 2, an enlargement, h, (shown in dotted lines,) on the plunger serving to limit the downward movement of said collar S.

The molds P, with which the devices attached to the spindles are adapted to co-operate, are arranged and secured directly beneath the spindles and upon the rotatable platform E, as shown in Fig. 1. In Figs. 1, 2, 3, and 6 I have shown these molds constructed with a view to the formation of large open-mouthed jars, those in Figs. 2, 3, and 6 having screw-threads on the exterior of their necks, such as shown in Figs. 8 and 9.

In the practical use of this machine the glass is first gathered, partially blown, marvered, &c., placed in the mold on the platform E, and blown therein, and the blow-pipe then detached, all as usual, after which the operator grasps the hand-rim I and rotates the platform and frame carrying the spindles, such rotation causing an independent rotation of the spindles on their own axes, and also causing one of said spindles to descend and the other to remain in an elevated position by reason of the cam D. The plunger attached to the end of the descending spindle while rotating enters the mold beneath it, and immediately thereafter the loose collar S strikes upon the top of the mold and causes the upper arms of the levers Q Q to be thrown upward, and their lower arms to be thrown outward and into contact with the interior of the neck of the jar in the mold, as seen in Fig. 2, the still plastic glass being held and formed closely against the walls of the mold, and the overflow or "blow-over" portion T to be cut off neatly at the point t by the co-operation of the levers and the walls of the mold, as will be readily understood. As is obvious, the arms r' r' can be made of any convenient length, and their operating surface or surfaces applied at any desired point within the mold. From the time the plunger enters the mold till it is again withdrawn therefrom by the operation of the cam D, it continues to rotate, and the forming and cutting-off levers rotating with it have ample opportunity to perform their functions.

The collars R and S, in addition to their function of operating upon the pressing-levers, serve as a cap for the top of the mold, and assist in retaining the heat of the glass during the pressing process.

The necks and mouths of successive jars formed in this way are uniformly and truly finished, and no difficulty is found in securing an accurate fit of the metallic tops or caps employed to cover them.

The forming and cutting-off devices are of course susceptible of various modifications. For instance, instead of employing a rigid collar, R, and a loose collar, S, as shown in Fig. 2, two collars may be connected together and left loose on the plunger, as shown at R' and S' in Fig. 3, with the same effect, and instead of employing the concave-shaped extremities of the arms r' of the levers Q Q, said arms may be furnished with rollers, such as shown at U U in Fig. 3, and the said rollers made to perform the forming and cutting-off operations.

It may sometimes be found desirable to charge the jar or bottle with compressed air during the operation of the plunger to maintain the semi-plastic glass in its proper position against the side of the mold, and to accomplish this I propose to introduce compressed air through an opening formed in the spindle and plunger, as shown in dotted lines, Fig. 2, the collars R and S serving as a cap to prevent the escape of the air from the mold.

The upper edge, V, of the mold is preferably made sharp, as shown, so that when the co-operating part of the collar S comes down any glass that may have lodged on said mold edge will be broken and cleared off.

While I have shown but two spindles and two molds upon the rotating table or platform, it is obvious that the number may be increased or diminished, if found more convenient.

In Figs. 4 and 5 I show modifications of my invention designed particularly for the manufacture of narrow-necked bottles. In these instances the forming and cutting-off tool consists simply of a tapered plunger, preferably rotating. The mold, as shown in Fig. 4, is formed to give the proper shape to the exterior of the neck of the bottle, and the plunger when entered expands or squeezes the plastic glass into the parts of the mold and cuts off the surplus glass or blow-over neatly at the point w. The arrangement shown in Fig. 5 differs from that shown in Fig. 4, in that a shoulder, y, is formed upon the plunger. This shoulder will perhaps tend to produce a more perfect finish to the inside of the neck of the bottle.

From what has been disclosed herein it is apparent that the principal advantages gained in the practice of my invention are that the jars, bottles, or other articles are enabled to be completely finished, with the exception of annealing, while still in the molds and without the necessity of any reheating, and that their mouths or necks are made uniform in thickness, height, and shape.

Referring to the mechanism for operating the plungers, as shown in Fig. 1, it is obvious that the same is well adapted for pressing or molding operations, suitable plungers being attached to the spindles, and when the rotation of the spindles or plungers attached thereto is not desired the band or cord O may be removed, in which case the plunger will be given a reciprocating motion only during a portion of the revolution of the table, and by the weight of the spindle and plunger the material deposited within the mold at one side of the base will be pressed and formed, and the plunger automatically withdrawn for the removal of the article at the other side.

The modification illustrated in Fig. 6 has reference to the means for operating the pivoted levers Q Q. In this instance the collars R S are dispensed with and the upper arms, r, of the levers Q Q are extended and weighted so as to hold the lower arms, r', normally within or against the plunger, so that when the latter is introduced within the mold said arms r r will make contact with the upper extended rim or mouth of the mold, and thus cause the lower arms, r' r', to be expanded against the mouth or neck of the vessel within the mold.

I am aware that it is not new in the manufacture of glass bottles, jars, &c., to form the neck and mouth of the article after it has been removed from the mold in which it was blown by means of hand finishing tools applied both within and without the article at the same time, this being shown, for instance, in United States Patent to Bennett, No. 55,988, of July 3, 1866.

I also know that it is not new to provide such finishing-tools with an expansible plunger, for this is shown in German Patent No. 13,372, of 1880, and also in United States Patent No. 55,988, above referred to; nor is it new to make articles of pressed glassware by cutting them out of a body of plastic glass between a moving die and plunger working through the walls inclosing the movable die, for this is shown and described in United States Letters Patent to Beck, No. 196,326, dated October 23, 1877. I therefore lay no claim to either of these several inventions.

Having thus described my invention, I claim as new—

1. In a machine for forming the mouths or necks of glass jars, bottles, &c., the combination, with the mold in which the jar or bottle is blown, of a rotating tool for pressing the neck of the jar or bottle outward against the mold and co-operating with the mold to cut off the surplus glass or blow-over, substantially as described.

2. In a machine for forming the mouths or necks of glass jars, bottles, &c., the combination, with the mold in which the jar or bottle is blown, of a tool for pressing the glass of the mouth or neck of the jar or bottle outward against the mold and co-operating with the mold to cut off the surplus glass or blow-over, substantially as described.

3. In a machine for forming the mouths or necks of glass jars, bottles, &c., the combination, with the mold, of an automatic rotating expansible forming-tool, substantially as described.

4. In a machine for forming the mouths or necks of glass jars, bottles, &c., the combination, with a mold in which the jar or bottle is blown, of a rotating expansible forming-tool for forcing the mouth or neck of the bottle laterally against the walls of the mold, substantially as described.

5. In a machine for forming the mouths or necks of glass jars, bottles, &c., the combination, with the mold, of an automatic rotating expansible forming and cutting-off device, substantially as described.

6. In a machine for forming the mouths or necks of glass jars, bottles, &c., the combination, with the mold having the cutting-off edge, of the co-operating expansible forming and cutting-off tool, substantially as described.

7. The combination, with the mold, of the spindle or plunger and the forming and cutting-off levers connected thereto, substantially as described.

8. The combination of the mold with the spindle or plunger, the forming and cutting-off levers pivoted thereto, and the loose collar, substantially as described.

9. In a machine for forming and finishing glass jars, bottles, &c., the combination, with the mold for forming the exterior of the vessel, of an automatic rotating expansible forming-tool for forcing the vessel outward against the walls of the mold, substantially as described.

10. In a machine for forming and finishing glass jars, bottles, &c., the combination, with the mold for forming the exterior of the vessel, of an automatic expansible forming-tool for forcing the vessel outward against the walls of the mold, substantially as described.

11. In a machine for forming and finishing glass jars, bottles, &c., the combination, with the mold for forming the exterior of the vessel, of an automatic forming-tool for forcing the vessel outward against the walls of the mold, substantially as described.

DANIEL W. NORRIS.

Witnesses:
A. S. STEUART,
CHAS. R. BURR.